US009406420B2

(12) United States Patent
Ohkubo et al.

(10) Patent No.: US 9,406,420 B2
(45) Date of Patent: Aug. 2, 2016

(54) COIL COMPONENT AND MAGNETIC METAL POWDER CONTAINING RESIN USED THEREFOR

(71) Applicant: TDK Corporation, Tokyo (JP)

(72) Inventors: Hitoshi Ohkubo, Tokyo (JP); Kyohei Tonoyama, Tokyo (JP); Makoto Morita, Tokyo (JP); Tomokazu Ito, Tokyo (JP); Hideto Itoh, Tokyo (JP); Yoshihiro Maeda, Tokyo (JP); Manabu Ohta, Tokyo (JP); Yuuya Kaname, Tokyo (JP); Takahiro Kawahara, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/018,293

(22) Filed: Sep. 4, 2013

(65) Prior Publication Data

US 2014/0077914 A1 Mar. 20, 2014

(30) Foreign Application Priority Data

Sep. 18, 2012 (JP) ................................ 2012-204830

(51) Int. Cl.

| | |
|---|---|
| ***H01F 17/00*** | (2006.01) |
| ***H01F 1/00*** | (2006.01) |
| ***B32B 15/00*** | (2006.01) |

(Continued)

(52) U.S. Cl.

CPC .. *H01F 5/00* (2013.01); *H01F 1/06* (2013.01); *H01F 1/26* (2013.01); *H01F 27/255* (2013.01); *H01F 27/2804* (2013.01);

(Continued)

(58) Field of Classification Search

CPC . H01F 17/04; H01F 2017/048; H01F 27/292; H01F 27/255; H01F 41/005; H01F 3/08; H01F 41/16; H01F 2003/106; H01F 1/14791; B22F 1/0007; B22F 3/02; B22F 1/0059

USPC .......... 336/177, 213, 222, 233; 428/544, 615, 428/928, 692.1, 842.1; 252/62.51; 148/300

See application file for complete search history.

(56) References Cited

U.S. PATENT DOCUMENTS

| | | | | |
|---|---|---|---|---|
| 5,350,628 A * | 9/1994 | Kugimiya et al. | ......... | 428/307.3 |
| 6,051,324 A * | 4/2000 | Moorhead | ................. | H01F 1/24 428/403 |

(Continued)

FOREIGN PATENT DOCUMENTS

| | | |
|---|---|---|
| JP | 5-299232 A | 11/1993 |
| JP | 2000294418 A * | 10/2000 |

(Continued)

*Primary Examiner* — Alexander Talpalatski
*Assistant Examiner* — Joselito Baisa
(74) *Attorney, Agent, or Firm* — McGinn IP Law Group PLLC

(57) ABSTRACT

A coil component 1 is provided with coil conductors 10*a* and 10*b* and a magnetic metal powder containing resin 22 (22*a* and 22*b*) covering the coil conductors 10*a* and 10*b*. The magnetic metal powder containing resin 22 includes first metal powder having a first average grain diameter, second metal powder having a second average grain diameter that is smaller than the first average grain diameter, and third metal powder having a third average grain diameter that is smaller than the second average grain diameter. The first average grain diameter is 15 μm or more and 100 μm or less. The third average grain diameter is 2 μm or less. The first metal powder mainly contains Permalloy and the second and third metal powders mainly contain carbonyl iron.

20 Claims, 4 Drawing Sheets

(51) Int. Cl.

| | |
|---|---|
| ***G11B 5/708*** | (2006.01) |
| ***H01F 5/00*** | (2006.01) |
| ***H01F 1/06*** | (2006.01) |
| ***H01F 1/26*** | (2006.01) |
| ***H01F 27/255*** | (2006.01) |
| ***H01F 27/28*** | (2006.01) |
| *H01F 27/29* | (2006.01) |

(52) U.S. Cl.
CPC ...... *H01F 27/292* (2013.01); *H01F 2017/0066* (2013.01); *H01F 2027/2809* (2013.01)

(56) References Cited

U.S. PATENT DOCUMENTS

| | | | | |
|---|---|---|---|---|
| 6,063,303 | A * | 5/2000 | Ohtaki | 252/62.54 |
| 6,726,740 | B1 * | 4/2004 | Draxler | F16K 31/06 419/29 |
| 6,780,255 | B2 * | 8/2004 | Kawano et al. | 148/122 |
| 6,888,435 | B2 * | 5/2005 | Inoue et al. | 336/83 |
| 7,064,642 | B2 * | 6/2006 | Komuro | H01F 1/086 252/62.51 R |
| 7,920,043 | B2 * | 4/2011 | Nakagawa et al. | 336/232 |
| 2002/0149458 | A1 * | 10/2002 | Fujiwara | H01F 1/0552 336/110 |
| 2003/0048167 | A1 | 3/2003 | Inoue et al. | |
| 2004/0046626 | A1 * | 3/2004 | Nakata et al. | 336/83 |
| 2005/0094302 | A1 * | 5/2005 | Matsuzaki | B82Y 25/00 360/55 |
| 2005/0116804 | A1 * | 6/2005 | Fujiwara | H01F 1/0552 336/233 |
| 2006/0279395 | A1 * | 12/2006 | Lee | H01F 1/26 336/221 |
| 2007/0052510 | A1 * | 3/2007 | Saegusa | H01F 27/022 336/92 |
| 2008/0003126 | A1 * | 1/2008 | Watanabe | B22F 1/02 419/35 |
| 2008/0100410 | A1 | 5/2008 | Tomita et al. | |
| 2008/0283188 | A1 * | 11/2008 | Oda | C01G 49/0018 156/277 |
| 2009/0045905 | A1 * | 2/2009 | Nakagawa | H01F 1/26 336/232 |
| 2010/0255282 | A1 * | 10/2010 | Hong et al. | 428/222 |
| 2013/0222101 | A1 | 8/2013 | Ito et al. | |

FOREIGN PATENT DOCUMENTS

| | | | |
|---|---|---|---|
| JP | 2001-250709 | A | 9/2001 |
| JP | 2003-203813 | A | 7/2003 |
| JP | 2004-273564 | A | 9/2004 |
| JP | 2005-354001 | A | 12/2005 |
| JP | 2006-066830 | A | 3/2006 |
| JP | 2007-200962 | A | 8/2007 |
| JP | 2008-135674 | A | 6/2008 |
| JP | 2008-218724 | A | 9/2008 |
| JP | 2010-123876 | A | 6/2010 |
| WO | WO 2012/053439 | A1 | 4/2012 |

* cited by examiner grain size distribution of the mixed powder including three grain diameter types

COIL COMPONENT AND MAGNETIC METAL POWDER CONTAINING RESIN USED THEREFOR

BACKGROUND OF THE INVENTION

1. Field of the Invention

The present invention relates to a coil component and a magnetic metal powder containing resin used therefor, and particularly relates to a composition of a magnetic metal powder containing resin that constitutes a magnetic path of a coil.

2. Description of Related Art

In the field of commercial or industrial electronic devices, a surface-mount coil component is frequently used as a power inductor. This is because the surface-mount coil component is small-sized, thin, and excellent in its electrical insulation property, and can be manufactured at a low cost.

As one of specific structures of the surface-mount coil component, there is a planar coil structure to which a printed circuit board technique is applied. This structure is briefly explained from the viewpoint of manufacturing processes. First, seed layers (base films) of a planar spiral shape are formed on a printed circuit board. The printed circuit board is immersed in a plating solution and a DC current ("plating current") is carried through the seed layers, thereby electrodepositing metal ions in the plating solution onto the seed layers. Accordingly, planar spiral conductors are formed. Thereafter, an insulating resin layer covering each of the formed planar spiral conductors, a protection layer, and a magnetic metal powder containing resin layer serving as a magnetic path are sequentially formed, thereby completing a coil component. This structure can keep the size and position accuracy very high and make the coil component small-sized and thin. Japanese Patent Application Laid-open No. 2006-66830 discloses a planar coil element having such a planar coil structure.

One of the methods of increasing the coil inductance is a method of improving the magnetic permeability of a magnetic path. To improve the magnetic permeability of the magnetic path in the coil component mentioned above, it is necessary to increase the packing fraction of metal powder in the magnetic metal powder containing resin. To increase the packing fraction of the metal powder, it is effective to fill the gaps of metal powder having a large grain diameter with metal powder having a small grain diameter. However, if packing becomes closer and the metal powder excessively contacts another metal powder, there is a problem that a core loss increases and DC superposition characteristics are degraded.

SUMMARY

Therefore, an object of the present invention is to provide a coil component capable of increasing its inductance while suppressing an increase in a core loss and magnetic metal powder containing resin used for the coil component.

To achieve the above object, a coil component according to the present invention comprises a coil conductor and magnetic metal powder containing resin covering the coil conductor, wherein the magnetic metal powder containing resin includes first metal powder having a first average grain diameter, second metal powder having a second average grain diameter that is smaller than the first average grain diameter, and third metal powder having a third average grain diameter that is smaller than the second average grain diameter, the first average grain diameter is 15 μm or more and 100 μm or less, and the third average grain diameter is 2 μm or less.

To achieve the above object, a magnetic metal powder containing resin according to the present invention comprises first metal powder having a first average grain diameter, second metal powder having a second average grain diameter that is smaller than the first average grain diameter, and third metal powder having a third average grain diameter that is smaller than the second average grain diameter, wherein the first average grain diameter is 15 μm or more and 100 μm or less, and the third average grain diameter is 2 μm or less.

According to the present invention, it is possible to obtain high magnetic permeability while preventing an increase in a core loss, because three types of metal powder having a different average grain diameter from one another are used as metal powder contained in the magnetic metal powder containing resin.

In the present invention, it is preferable that the first metal powder is higher in magnetic permeability than the second metal powder and the third metal powder. In this case, it is preferable that the first metal powder mainly contains Permalloy, and that the second metal powder and the third metal powder mainly contain iron.

In the present invention, it is preferable that the second average grain diameter is 3 μm or more and 10 μm or less. In this case, it is preferable that the second average grain diameter is 3 μm or more and 5 μm or less and that the third average grain diameter is 1 μm or less.

In the present invention, it is preferable that a weight ratio of the second metal powder relative to the third metal powder is 0.33 or more and 3 or less. It is also preferable that a weight ratio of the first metal powder in all of the first metal powder to the third metal powder is 0.7 or more and 0.8 or less.

In the present invention, it is preferable that a weight ratio of the first metal powder, the second metal powder, and the third metal powder is 6:1:1. This makes it possible to prevent an increase in the core loss and to improve magnetic permeability in a balanced manner.

In the present invention, it is preferable that the coil conductor includes a planar spiral conductor that is formed on a surface of a board by plating. In this case, it is preferable that the coil conductor is formed between an outermost circumference of the planar spiral conductor and an end portion on the surface, and that the coil conductor further includes a dummy lead conductor that is connected to another conductor at least on a same plane.

It is preferable that the coil component according to the present invention further comprises insulating resin covering the planar spiral conductor and the dummy lead conductor, and that the magnetic metal powder containing resin covers the surface of the board from above the insulating resin.

According to the present invention, materials of the magnetic metal powder containing resin that constitutes a magnetic path of a coil include an intermediate grain diameter metal powder in addition to a large grain diameter metal powder and a small grain diameter metal powder. Therefore, it is possible to increase a distance from one metal powder to another metal powder, thereby reducing the core loss. Furthermore, the magnetic permeability can be kept constant without any decrease even if the packing density decreases because of the intermediate grain diameter metal powder.

DETAILED DESCRIPTION OF THE EMBODIMENTS

Preferred embodiments of the present invention will be described in detail below with reference to the accompanying drawings.

DETAILED DESCRIPTION OF THE EMBODIMENTS

Preferred embodiments of the present invention will be explained below in detail with reference to the accompanying drawings.

Figure 1:
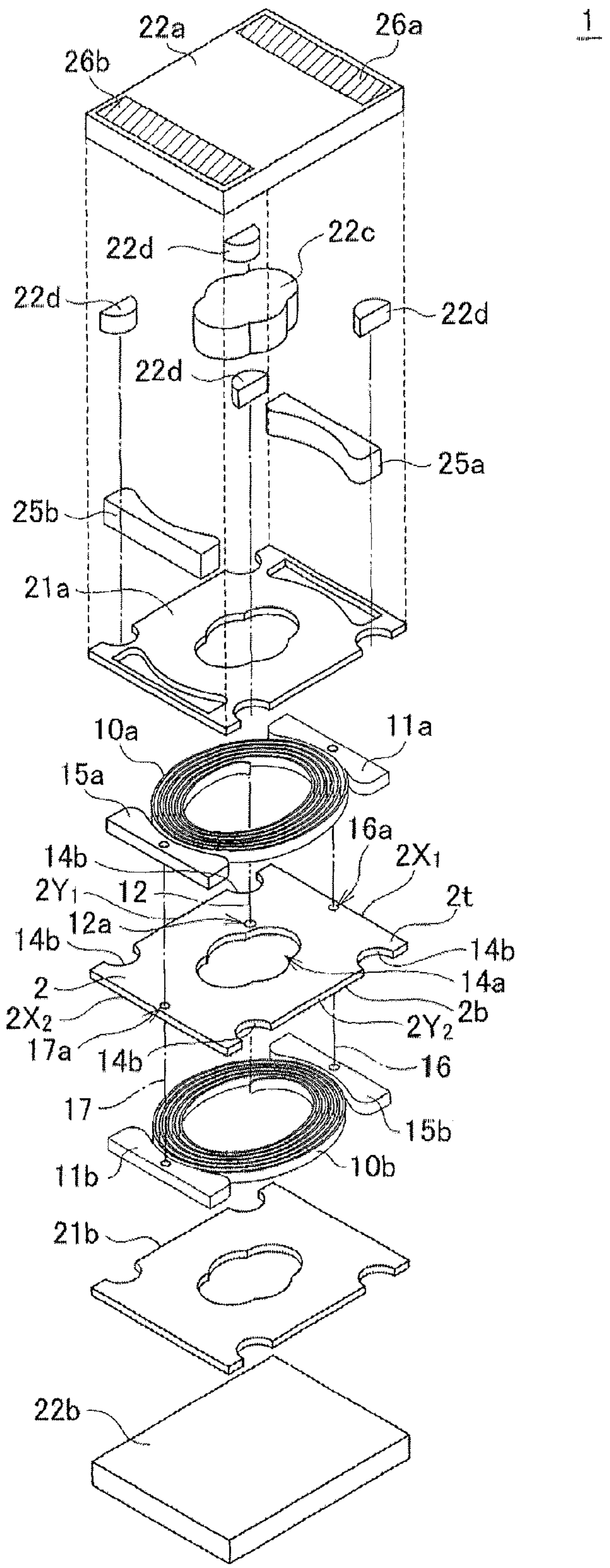
FIG. 1 is an exploded perspective view of a coil component 1 according to a first embodiment of the present invention.

FIG. 1 is an exploded perspective view of a coil component 1 according to a first embodiment of the present invention. As shown in FIG. 1, the coil component 1 includes a generally rectangular substrate 2. "Generally rectangular" means that the corresponding rectangle includes not only a complete rectangle but also a rectangle of which corners are partially missing. In the present specification, while a term "corners" of a rectangle is used, "corners" of a rectangle having partially missing corners means the corners of a complete rectangle obtained if no missing corners are present.

It is preferable to use a general printed circuit board formed by impregnating a glass cloth with epoxy resin as the material of the substrate 2. Alternatively, BT resin, FR4 or FR5, for example, can be used as the material of the substrate 2.

A planar spiral conductor 10*a* (first planar spiral conductor) is formed in a central portion of a top surface 2*t* of the substrate 2. Similarly, a planar spiral conductor 10*b* (second planar spiral conductor) is formed in a central portion of a back surface 2*b* of the substrate 2. Furthermore, a conductor-burying through-hole 12*a* is provided in the substrate 2 and a through-hole conductor 12 (first through-hole conductor) is buried in the through-hole 12*a*. The through-hole conductor 12 connects an inner peripheral end of the planar spiral conductor 10*a* to that of the planer spiral conductor 10*b*.

It is preferable that the planar spiral conductors 10*a* and 10*b* have an elliptical spiral shape. The elliptical spiral shape can secure a loop size as large as possible as long as the elliptical spiral shape can be formed while matching the rectangular shape of the substrate 2. Furthermore, when through-hole magnetic bodies 22*d* corresponding to four corners of the substrate 2, respectively and closer to a center than the corners in a width direction are formed, it is easier to secure formation regions of the through-hole magnetic bodies 22*d* in a case where the planar spiral conductors 10*a* and 10*b* are of the elliptical spiral shape than a case where the planar spiral conductors 10*a* and 10*b* are of an oval spiral shape (details of this arrangement are described later).

The planar spiral conductors 10*a* and 10*b* are wound in a direction opposite to each other. That is, the planar spiral conductor 10*a* as viewed from a side of the top surface 2*t* is wound counterclockwise from the inner peripheral end to an outer peripheral end whereas the planar spiral conductor 10*b* as viewed from the side of the top surface 2*t* is wound clockwise from the inner peripheral end to an outer peripheral end. By adopting such a winding method, the both planar spiral conductors 10*a* and 10*b* generate magnetic fields in the same direction and intensify the mutual magnetic fields in the coil component 1 when a current is carried between the outer peripheral end of the planar spiral conductor 10*a* and that of the planar spiral conductor 10*b*. Therefore, the coil component 1 functions as a single inductor.

Lead conductors 11*a* and 11*b* are formed on the top surface 2*t* and the back surface 2*b* of the substrate 2, respectively. The lead conductor 11*a* (first lead conductor) is formed along a side surface $2X_1$ of the substrate 2. On the other hand, the lead conductor 11*b* (second lead conductor) is formed along a side surface $2X_2$ of the substrate 2 that is opposed to the side surface $2X_1$. The lead conductor 11*a* is connected to the outer peripheral end of the planar spiral conductor 10*a* and the lead conductor 11*b* is connected to the outer peripheral end of the planar spiral conductor 10*b*.

A dummy lead conductor 15*a* (first dummy lead conductor) is formed in a region between an outermost circumference of the planar spiral conductor 10*a* and an end portion of the substrate 2. More specifically, the dummy lead conductor 15*a* has a planar shape almost identical to that of the lead conductor 11*b* and is arranged at a position at which the dummy lead conductor 15*a* is overlapped with the lead conductor 11*b* in a plan view. That is, the dummy lead conductor 15*a* is formed between a side surface $2X_2$ of the substrate 2 and the outermost circumference of the planar spiral conductor 10*a*. Although not connected to another conductor on the same plane, the dummy lead conductor 15*a* is connected to the lead conductor 11*b* via a through-hole conductor 17 (second through-hole conductor) that penetrates the substrate 2. A conductor-burying through-hole 17*a* is provided in the substrate 2 and the through-hole conductor 17 is buried in the through-hole 17*a*.

Similarly, a dummy lead conductor 15*b* (second dummy lead conductor) is formed in a region between an outermost circumference of the planar spiral conductor 10*b* and an end portion of the substrate 2. More specifically, the dummy lead conductor 15*b* has a planar shape almost identical to that of the lead conductor 11*a* and is arranged at a position at which the dummy lead conductor 15*b* is overlapped with the lead conductor 11*a* in a plan view. That is, the dummy lead conductor 15*b* is formed between a side surface $2X_1$ of the substrate 2 and the outermost circumference of the planar spiral conductor 10*b*. Similarly to the dummy lead conductor 15*a*, although not connected to another conductor on the same plane, the dummy lead conductor 15*b* is connected to the lead conductor 11*a* via a through-hole conductor 16 (third through-hole conductor) that penetrates the substrate 2. A conductor-burying through-hole 16*a* is provided in the substrate 2 and the through-hole conductor 16 is buried in the through-hole 16*a*.

A side surface of the dummy lead conductor 15*a* that is opposed to the outermost circumference of the planar spiral conductor 10*a* is bent while matching the shape of the outermost circumference of the planar spiral conductor 10*a*. Similarly, aside surface of the dummy lead conductor 15*b* that is opposed to the outermost circumference of the planar spiral conductor 10*b* is bent while matching the shape of the outermost circumference of the planar spiral conductor 10*b*. When the side surfaces of the dummy lead conductors 15*a* and 15*b* are formed into such a bent shape, it is possible to ensure suppressing the lateral growth of plated layers (described later) constituting the planar spiral conductors 10*a* and 10*b*, respectively and to form a highly accurate pattern. It is preferable that a space width between the planar spiral conductors 10*a* or 10*b* and the dummy lead conductor 15*a* or 15*b* is set almost equal to a space width of each turn of the planar spiral conductor 10*a* or 10*b*. It is possible to control characteristics with higher accuracy, because such a setting can make a line width of the outermost turn of the planar spiral conductor 10*a* or 10*b* equal to that of an inner turn thereof.

The planar spiral conductors 10*a* and 10*b*, the lead conductors 11*a* and 11*b*, and the dummy lead conductors 15*a* and

15*b* described above are formed in two electroplating processes after forming base layers by an electroless plating process. It is preferable to use Cu as both a material of the base layers and a material of the plated layers formed in the two electroplating processes. In the second electroplating process, the plated layers may greatly grow laterally in portions in which no other adjacent seed layer is present. However, because the dummy lead conductors 15*a* and 15*b* are provided, there is no probability that the outermost turns of the planar spiral conductors 10*a* and 10*b* become extremely wide and a desired wiring shape can be maintained.

The planar spiral conductor 10*a*, the lead conductor 11*a*, and the dummy lead conductor 15*a* provided on the side of the top surface 2*t* of the substrate 2 are covered with an insulating resin layer 21*a*. This insulating resin layer 21*a* is provided to prevent electrical continuity of each of the conductors 10*a*, 11*a*, and 15*a* to a magnetic metal powder containing resin layer 22*a*. Similarly, the planar spiral conductor 10*b*, the lead conductor 11*b*, and the dummy lead conductor 15*b* provided on the side of the back surface 2*b* of the substrate 2 are covered with an insulating resin layer 21*b*. This insulating resin layer 21*b* is provided to prevent electrical continuity of each of the conductors 10*b*, 11*b*, and 15*b* to a magnetic metal powder containing resin layer 22*b*. The insulating resin layers 21*a* and 21*b* are also generically referred to as "insulating resin layers 21". Furthermore, the metallic-magnetic-powder containing resin layers 22*a* and 22*b* are also generically referred to as "metallic-magnetic-powder containing resin layers 22".

The top surface 2*t* and the back surface 2*b* of the substrate 2 are further covered with the magnetic metal powder containing resin layers 22 (22*a* and 22*b*) from above the insulating resin layers 21 (21*a* and 21*b*), respectively. The magnetic metal powder containing resin layers 22*a* and 22*b* are made of a magnetic material (magnetic metal powder containing resin) produced by mixing magnetic metal powder into resin.

Figure 2:
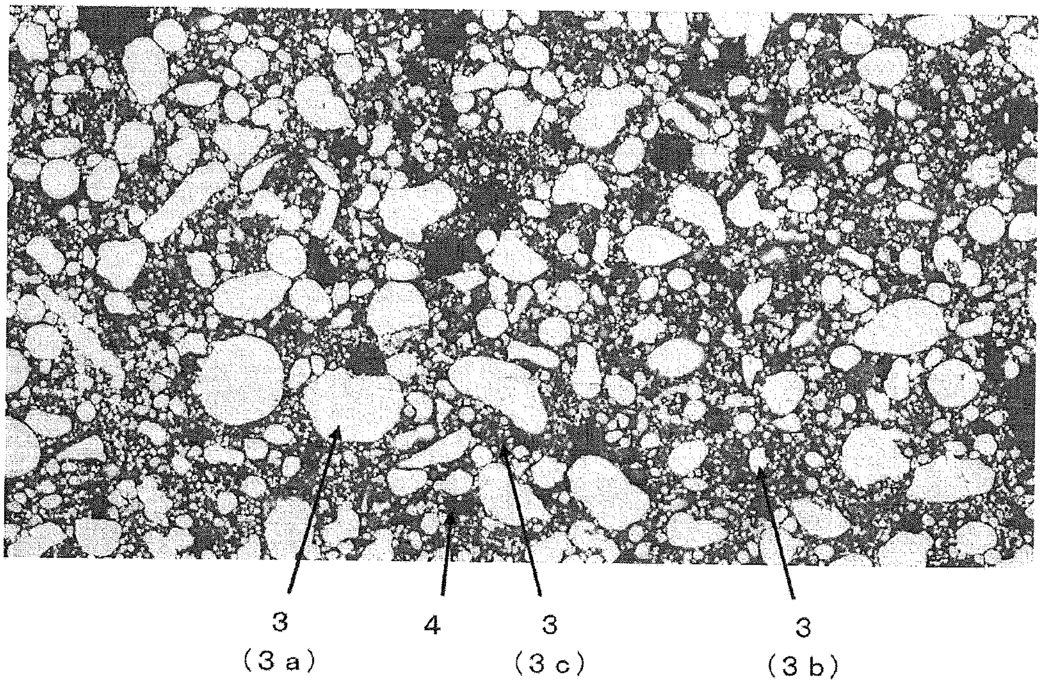
FIG. 2 is a microscope photograph showing a structure of the magnetic metal powder containing resin layer.

FIG. 2 is a microscope photograph showing a structure of the magnetic metal powder containing resin layer 22. As shown in FIG. 2, the magnetic metal powder containing resin layer 22 contains magnetic metal powder 3 and resin 4. In FIG. 2, a white part corresponds to the magnetic metal powder 3 and a black part corresponds to the resin 4.

It is preferable to use a Permalloy-based material as a main component of the magnetic metal powder 3. Specifically, the magnetic metal powder 3 contains Pb—Ni—Co alloy and carbonyl iron by a predetermined ratio, for example, a weight ratio from 70:30 to 80:20, preferably a weight ratio of 75:20. The content rate of the magnetic metal powder 3 in the magnetic metal powder containing resin layer 22 is preferably 90 to 97 weight %. In FIG. 2, magnetic metal powder 3*a* having a large grain diameter is Permalloy powder and each of magnetic metal powder 3*b* having an intermediate grain diameter and magnetic metal powder 3*c* having a small grain diameter is carbonyl iron powder. It is preferable that the average grain diameter of the Permalloy powder 3*a* is 15 μm or more and 100 μm or less and that the average grain diameter of the carbonyl iron powder 3*b* or 3*c* is 10 μm or less.

On the other hand, as the resin 4, it is preferable to use epoxy resin liquid or epoxy resin powder. Furthermore, it is preferable that a content rate of the resin 4 in the magnetic metal powder containing resin layer 22 is 3 to 10 weight %. The resin 4 functions as an insulation binder. The magnetic metal powder containing resin layer 22 having the above composition has properties that a saturation magnetic flux density becomes smaller as the amount of the magnetic metal powder 3 relative to the resin 4 is smaller and that the magnetic flux density conversely becomes larger as the amount of the magnetic metal powder 3 relative to the resin 4 is larger.

In the present embodiment, it is preferable to use two types of carbonyl iron powder having a mutually different average grain diameter. Specifically, it is preferable to contain the intermediate grain diameter carbonyl iron powder 3*b* having an average grain diameter of 3 μm or more and 10 μm or less and the small grain diameter carbonyl iron powder 3*c* having an average grain diameter of 2 μm or less by a predetermined ratio, for example, within a weight ratio range from 0.5:1.5 to 1.5:0.5. In other words, a weight ratio of the carbonyl iron powder 3*b* having the average grain diameter of 3 μm or more and 10 μm or less relative to the carbonyl iron powder 3*c* having the average grain diameter of 2 μm or less is preferably within a range from 0.33 or more and 3 or less.

It is particularly preferable that the weight ratio of the carbonyl iron powder 3*b* having an average grain diameter of 3 μm or more and 10 μm or less to the carbonyl iron powder 3*c* having an average grain diameter of 2 μm or less is 1:1. In an expression including Permalloy powder, it is preferable to use the magnetic metal powder 3 containing the Permalloy powder (first metal powder) 3*a* having an average grain diameter of 15 μm or more and 100 μm or less, the carbonyl iron powder (second metal powder) 3*b* having an average grain diameter of 3 μm or more and 10 μm or less, and the carbonyl iron powder (third metal powder) 3*c* having an average grain diameter of 2 μm or less by a predetermined rate, for example, within a weight ratio range from 70:15:15 to 80:10:10, preferably a weight ratio of 75:12.5:12.5 (6:1:1). It is particularly preferable that the average grain diameter of the small grain diameter carbonyl iron powder 3*c* is 1 μm or less. Furthermore, it is preferable that the average grain diameter of the intermediate grain diameter carbonyl iron powder 3*b* that is the second metal powder is 0.1 to 0.3 times as large as that of the large grain diameter Permalloy powder 3*a*.

In this way, the coil component 1 according to the present embodiment uses three types of magnetic metal powder having a mutually different average grain diameter from one another as the material of the magnetic metal powder containing resin layer 22, and the intermediate grain diameter magnetic metal powder 3*b* between the large grain diameter magnetic metal powder 3*a* and the small grain diameter magnetic metal powder 3*c* is added. Therefore, it is possible to increase magnetic permeability while suppressing an increase in a core loss, thereby increasing the coil inductance. The magnetic permeability of the magnetic metal powder containing resin depends on the grain diameter and the packing density (bulk density) of the magnetic metal powder 3. By using the small grain diameter magnetic metal powder 3*c* so as to fill gaps of the large grain diameter magnetic metal powder 3*a*, it is possible to increase the magnetic permeability. However, if packing becomes closer and a distance between two adjacent magnetic metal grains excessively becomes closer, the core loss increases. Therefore, by adding intermediate-diameter grains between large-diameter grains and small-diameter grains, the magnetic permeability can be improved without increasing the core loss. Although the packing density of the magnetic metal powder 3 slightly decreases by the use of the intermediate grain diameter magnetic metal powder 3*b*, the magnetic permeability can be maintained by as much as an increase in grain diameter.

As shown in FIG. 1, a through-hole 14*a* that penetrates a central portion (a hollow portion) of the substrate 2 surrounded by the planar spiral conductors 10*a* and 10*b* and four through-holes 14*b* that penetrate outside of the planar spiral conductors 10*a* and 10*b* are formed in the substrate 2. The four through-holes 14*b* are semicircular openings provided onside surfaces $2Y_1$ and $2Y_2$ of the substrate 2 and correspond to the four corners of the substrate 2, respectively. The magnetic metal powder containing resin is also buried in these through-holes 14*a* and 14*b*, and the buried magnetic metal powder containing resin constitutes the through-hole magnetic bodies 22*c* and 22*d* as shown in FIG. 1. The through-hole magnetic bodies 22*c* and 22*d* are provided to form a completely closed magnetic path on the coil component 1.

Although not shown in FIG. 1, thin insulating layers are formed on surfaces of the magnetic metal powder containing resin layers 22*a* and 22*b*, respectively. These insulating layers are formed by performing a phosphate treatment on the surfaces of the magnetic metal powder containing resin layers 22*a* and 22*b*. By providing these insulating layers, the electrical continuity of an external electrode 26*a* to each of the magnetic metal powder containing resin layers 22*a* and 22*b* is prevented.

In the coil component 1 according to the present embodiment, a bump electrode 25*a* (first bump electrode) is formed on an upper surface of the lead conductor 11*a* and a bump electrode 25*b* (second bump electrode) is formed on an upper surface of the dummy lead conductor 15*a*. The bump electrodes 25*a* and 25*b* are formed by forming a resist pattern for exposing only the upper surfaces of the lead conductor 11*a* and the dummy lead conductor 15*a* and by further electroplating each of the conductors 11*a* and 15*a* as the seed layer. A process of forming the insulating resin layers 21*a* and 21*b* and that of forming the magnetic metal powder containing resin layers 22*a* and 22*b* are performed after forming the bump electrodes 25*a* and 25*b*.

It is preferable that the planar shapes of the bump electrodes 25*a* and 25*b* are identical to or smaller in size than those of the lead conductor 11*a* and the dummy lead conductor 15*a* and extend in a longitudinal direction of the lead conductor 11*a* and the dummy lead conductor 15*a*, respectively. With this configuration, it is possible to improve yield of forming the bump electrodes 25*a* and 25*b* and to shorten the plated-layer growth time. In the present specification, "bump electrode" means a thick plated electrode formed by a plating treatment differently from an electrode formed by thermally bonding a metallic ball made of Cu, Au, or the like using a flip-chip bonder. The thickness of each of the bump electrodes 25*a* and 25*b* is equal to or larger than that of the magnetic metal powder containing resin layer 22.

A pair of external electrodes 26*a* and 26*b* (first and second external electrodes) are formed on a bottom surface of the coil component 1 and on a main surface of the magnetic metal powder containing resin layer 22*a*. FIG. 1 shows a state where the bottom surface (a mount surface) of the coil component 1 is arranged to face up. The external electrodes 26*a* and 26*b* are connected to the lead conductors 11*a* and 11*b* via the bump electrodes 25*a* and 25*b* described above, respectively. The external electrodes 26*a* and 26*b* are mounted on a land formed on a printed circuit board (not shown) by soldering. With this configuration, it is possible to carry a current between the outer peripheral end of the planar spiral conductor 10*a* and that of the planar spiral conductor 10*b* through wirings formed on the printed circuit board.

The external electrodes 26*a* and 26*b* are in a rectangular pattern and larger in area than the bump electrodes 25*a* and 25*b* for the following reasons. To increase the coil inductance, it is required to make a coil formation region as large as possible. To design the coil formation region to be large within a range of a preset size, it is appropriate to make the lead conductors 11*a* and 11*b* and the dummy lead conductors 15*a* and 15*b* arranged outside of the coil as small as possible. However, when the lead conductors 11*a* and 11*b* and the dummy lead conductors 15*a* and 15*b* are made small in area in a case of forming the bump electrodes 25*a* and 25*b* by using the lead conductor 11*a* and the dummy lead conductor 15*a* and making exposed surfaces thereof serve as the external electrodes 26*a* and 26*b*, the bump electrodes 25*a* and 25*b* formed on the lead conductor 11*a* and the dummy lead conductor 15*a* are also made small in area, and it is impossible to keep the mounting strength. Therefore, in the present embodiment, mounting strength is secured by providing external electrodes (sputter electrodes) 26*a* and 26*b* that are larger in area than the bump electrodes 25*a* and 25*b*.

In the present embodiment, the external electrodes 26*a* and 26*b* are formed selectively on the main surface of the magnetic metal powder containing resin layer 22*a*. That is, these external electrodes are formed only on the bottom surface of the coil component 1 and not on side surfaces and an upper surface of the coil component 1. When these external electrodes are also formed on the side surfaces of the coil component 1, solder fillets are formed at the time of surface mounting, which makes it possible to visually confirm a chip mounting state and to ensure the mounting. However, it is required to secure a wider mounting margin of the coil component 1 by as much as the solder fillets. Furthermore, when these external electrodes are formed on the upper surface of the coil component 1 and an upper portion of the printed circuit board is covered with a metallic cover, there is a problem that the external electrodes of the coil component 1 contact the metallic cover. However, when the external electrodes 26*a* and 26*b* are formed only on the bottom surface of the coil component 1, the problems described above can be avoided and high-density mounting can be realized by omitting the solder fillets.

As described above, the coil component 1 according to the present embodiment uses three types of magnetic metal powder having a mutually different average grain diameter from one another and adds intermediate-diameter grains between large-diameter grains and small-diameter grains. Therefore, it is possible to prevent an increase in the core loss due to the closer packing and the shorter distance between the grains. Accordingly, it is possible to improve the magnetic permeability of each magnetic metal powder containing resin layer 22 while suppressing the increase in the core loss. In this manner, it becomes possible to provide a power-supply choke coil that is excellent in DC superposition characteristics.

The coil component 1 according to the present embodiment can realize further improvement in the characteristics described above, because the through-hole magnetic bodies 22*c* and 22*d* are formed in portions corresponding to each corner of the substrate 2 and the central portions of the planar spiral conductors 10*a* and 10*b* and the through-hole magnetic bodies 22*c* and 22*d* are made of the same material as that of the magnetic metal powder containing resin layers 22.

While preferred embodiments of the present invention have been explained above, the present invention is not limited thereto. Various modifications can be made to the embodiments without departing from the scope of the present invention and it is needless to say that such modifications are also embraced within the scope of the invention.

For example, the coil component 1 according to the present embodiment uses the planar spiral conductors 10*a* and 10*b* provided on the insulating substrate 2 as the coil conductors. However, the present invention is not limited to planar spiral conductors but is also applicable to various types of coil components using the magnetic metal powder containing resin. Furthermore, it suffices that the magnetic metal powder containing resin covers coil conductors so as to form a magnetic path and a covering mode is not limited to any specific mode.

Further, in the present embodiment, Permalloy is used as the main component of the first metal powder that constitutes the magnetic metal powder containing resin and the carbonyl iron is used as the main component of the second and third metal powder. However, the present invention is not limited to such a composition but various types of materials can be used. In this case, it is necessary that at least the first metal powder is a magnetic body so as to constitute the magnetic metal powder containing resin.

EXAMPLES

Samples A1 to A5 of the magnetic metal powder containing resin were prepared, and magnetic permeability μi, tap density, and three-point bonding strength of these samples were measured. The samples A1 to A5 were similar in that each of the samples contained the Permalloy powder having an average grain diameter of 31 μm and one or two types of carbonyl iron powder having a smaller average grain diameter than that of this Permalloy powder, and were different only in the grain diameter or the weight ratio. Furthermore, 3 weight % of epoxy resin was used as the binder in each of the samples.

The sample A1 contained Permalloy powder having an average grain diameter of 31 μm and carbonyl iron powder having an average grain diameter of 4 μm, the weight ratio was 6:2, and carbonyl iron powder having an average grain diameter of 1 μm was not used. The sample A2 contained Permalloy powder having an average grain diameter of 31 μm, carbonyl iron powder having an average grain diameter of 4 μm, and carbonyl iron powder having an average grain diameter of 1 μm, and the weight ratio was 6:1.5:0.5. The sample A3 contained Permalloy powder having an average grain diameter of 31 μm, carbonyl iron powder having an average grain diameter of 4 μm, and carbonyl iron powder having an average grain diameter of 1 μm, and the weight ratio was 6:1:1. The sample A4 contained Permalloy powder having an average grain diameter of 31 μm, carbonyl iron powder having an average grain diameter of 4 μm, and carbonyl iron powder having an average grain diameter of 1 μm, and the weight ratio was 6:0.5:1.5. The sample A5 contained Permalloy powder having an average grain diameter of 31 μm and carbonyl iron powder having an average grain diameter of 1 μm, the weight ratio was 6:2, and carbonyl iron powder having an average grain diameter of 4 μm was not used.

Next, the magnetic permeability μi, the tap density, and the three-point bonding strength of the samples A1 to A5 were measured. In the measurement of the magnetic permeability μi, a toroidal core formed to have an outside diameter of 15 mm, an inside diameter of 9 mm, and a height of 3 mm was used as a core of each of the samples A1 to A5, and a copper wire of 0.70 mmϕ (a coating thickness of 0.15 mm) was wound around the toroidal core by 20 turns, with conditions of a room temperature, 0.4 A/m, 0.5 mA, and 100 kHz set equally to all of the samples A1 to A5. In the measurement of the tap density, a tap-density measurement tester was used. In the measurement of the three-point bending strength, each of the samples A1 to A5 was formed to have a size of 20×10×1 (mm), lower surfaces of both longitudinal ends of each of the samples A1 to A5 were supported, a load was applied onto an upper surface of a longitudinal central portion of each of the samples A1 to A5 at 1 mm/min, and the bending strength was measured at a time of crushing the samples, respectively. Table 1 shows results of these measurements.

TABLE 1

| | Permalloy powder 31 μm:iron powder 4 μm:iron powder 1 μm | | | | |
|---|---|---|---|---|---|
| | Sample A1 6:2:0 | Sample A2 6:1.5:0.5 | Sample A3 6:1:1 | Sample A4 6:0.5:1.5 | Sample A5 6:0:2 |
| magnetic permeability μi | 32 | 34 | 35 | 35 | 35 |
| tap density (g/cc) (0.4 A/m, 100 kHz, 20 Ts) | 5.23 | 5.28 | 5.34 | 5.37 | 5.4 |
| three-point bonding strength (MPa) | 4.6 | 4.3 | 4.1 | 3.7 | 3.3 |

As shown in Table 1, the magnetic permeability μi of the sample A1 was 32 (H/m), the magnetic permeability μi of the sample A2 was 34 (H/m), and the magnetic permeability of the samples A3 to A5 was 35 (H/m). This result indicated that the magnetic permeability μi decreased when the weight ratio of a content of the carbonyl iron powder having an average grain diameter of 1 μm was lower than 1. The magnetic permeability μi was as low as 32 (H/m) particularly if the sample did not at all contain the carbonyl iron powder having an average grain diameter of 1 μm. Therefore, it was understood that the magnetic metal powder containing resin preferably contained the carbonyl iron powder having an average grain diameter of 1 μm by the weight ratio equal to or higher than 0.5.

As shown in Table 1, the tap density of the sample A1 was 5.23 (g/cc), the tap density became higher as an addition ratio of the carbonyl iron powder having an average grain diameter of 1 μm increased, and the tap density (g/cc) of the sample A5 was 5.40. In this way, it was understood that the tap density became higher as more carbonyl iron powder having an average grain diameter of 1 μm was added.

As also shown in Table 1, the three-point bending strength of the sample A1 was 4.6 (MPa), the three-point bending strength became lower as the addition ratio of the carbonyl iron powder having an average grain diameter of 1 μm to the carbonyl iron powder having an average grain diameter of 4 μm increased, and the sample A5 had the lowest three-point bending strength of 3.3 (MPa). In this way, it was understood that the three-point bending strength became lower as more carbonyl iron powder having an average grain diameter of 1 μm was added. Therefore, it was understood that it was more preferable to contain more carbonyl iron powder having an average grain diameter of 4 μm than the carbonyl iron powder having an average grain diameter of 1 μm.

Figure 3:
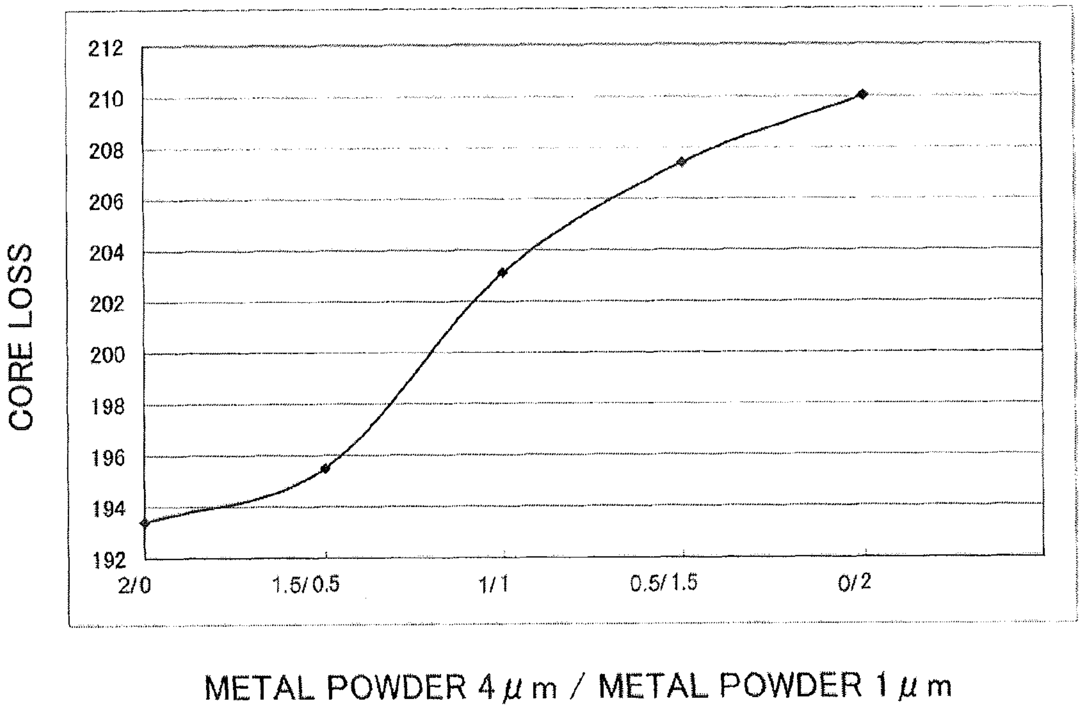
FIG. 3 is a graph showing a result of the measurement of the core loss of samples A1-A5.

Next, core losses Pcv (kW/m$^3$) of the samples A1 to A5 were measured. A B-H analyzer was used in the measurement of the core losses, and a magnetic force was applied to each sample by a magnetic flux density of 10 mT. Table 2 shows a result of the measurement. FIG. 3 shows a graphical representation of the result of Table 2, and is a graph showing a relation between the weight ratio of the intermediate grain diameter iron powder to the small grain diameter iron powder and the core loss.

TABLE 2

| | CORE LOSS (kW/m$^3$) | | | | |
|---|---|---|---|---|---|
| Frequency (kHz) | Sample A1 6:2:0 | Sample A2 6:1.5:0.5 | Sample A3 6:1:1 | Sample A4 6:0.5:1.5 | Sample A5 6:0:2 |
| 1000 | 193.4 | 195.5 | 203.1 | 207.4 | 210 |
| 2000 | 693.4 | 701.3 | 720.4 | 750.1 | 780 |
| 3000 | 1503.4 | 1520.3 | 1540.5 | 1560.4 | 1660 |

As shown in Table 2 and FIG. 3, it was understood that the core loss decreased as more carbonyl iron powder having an average grain diameter of 4 μm relative to the carbonyl iron powder having an average grain diameter of 1 μm was added, and that the core loss increased conversely as relatively more carbonyl iron powder having an average grain diameter of 1 μm was added. Therefore, it was understood that it was possible that the increase in the core loss was suppressed more as the weight ratio of the carbonyl iron powder having an average grain diameter of 4 μm relative to the carbonyl iron powder having an average grain diameter of 1 μm was set higher.

Figure 4:
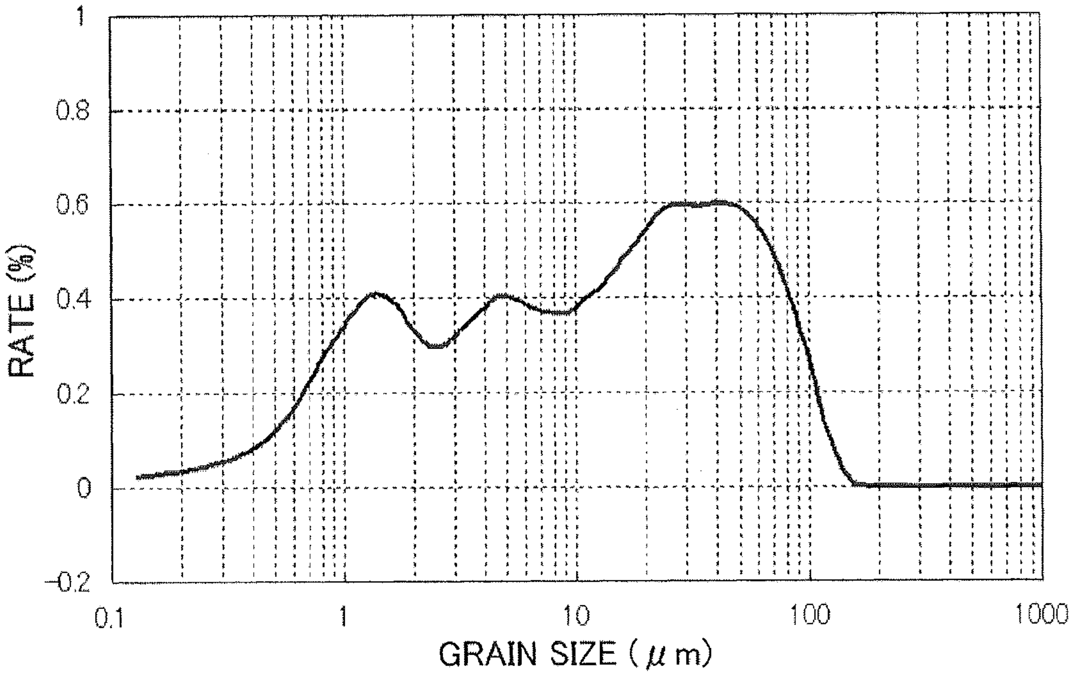
FIG. 4 is a graph showing a grain size distribution of the sample A3.

Next, a grain size distribution of the magnetic metal powder in the sample A3 was measured. As described above, the sample A3 contained Permalloy powder having an average grain diameter of 31 μm, carbonyl iron powder having an average grain diameter of 4 μm, and carbonyl iron powder having an average grain diameter of 1 μm by a weight ratio of 75:12.5:12.5. FIG. 4 shows a result of the measurement of the grain size distribution of the sample A3.

As evident from a graph of FIG. 4, three peaks clearly appeared on the grain size distribution of the sample A3 to correspond to the average grain diameter of the three types of magnetic metal powder, respectively. In this way, it was understood that the grain size distribution had three peaks when three types of magnetic metal powder having a mutually different average grain diameter and preferable as the material of the magnetic metal powder containing resin layer are used.

What is claimed is:

1. A coil component, comprising:

a coil conductor; and a magnetic metal powder containing resin covering the coil conductor, wherein the magnetic metal powder containing resin includes a first metal powder having a first average grain diameter, a second metal powder having a second average grain diameter that is smaller than the first average grain diameter, and a third metal powder having a third average grain diameter that is smaller than the second average grain diameter, wherein the first average grain diameter is 15 μm or more and 100 μm or less, wherein the second average grain diameter is 3 μm or more and less than 10 μm, and wherein the third average grain diameter is more than one-fifth of the second average grain diameter and 2 μm or less.

2. The coil component as claimed in claim 1, wherein a magnetic permeability of the first metal powder is higher than that of the second and third metal powders.

3. The coil component as claimed in claim 2, wherein the first metal powder mainly contains Permalloy, and the second and third metal powders mainly contain iron.

4. The coil component as claimed in claim 1, wherein the second average grain diameter is 3 μm or more and 4 μm or less, and wherein the third average grain diameter is 1 μm or less.

5. The coil component as claimed in claim 1, wherein a weight ratio of the second metal powder relative to the third metal powder is 0.33 or more and 3 or less.

6. The coil component as claimed in claim 1, wherein a weight ratio of the first metal powder in all of the first to third metal powders is 0.7 or more and 0.8 or less.

7. The coil component as claimed in claim 6, wherein a weight ratio of the first metal powder, the second metal powder, and the third metal powder is 6:1:1.

8. The coil component as claimed in claim 1, wherein the coil conductor includes a planar spiral conductor that is formed on a surface of a substrate by plating.

9. The coil component as claimed in claim 1, wherein the first metal powder mainly contains Permalloy, and the second and third metal powders mainly contain iron.

10. The coil component as claimed in claim 9, wherein an average grain diameter of the iron in the second metal powder is 0.1 to 0.3 times of an average grain diameter of the Permalloy in the first metal powder.

11. The coil component as claimed in claim 1, wherein a weight ratio of the first metal powder, the second metal powder, and the third metal powder, respectively, is in a range from 70:15:15 to 80:10:10.

12. The coil component as claimed in claim 1, wherein the second average grain diameter is 8 μm or less.

13. A magnetic metal powder containing resin, comprising:

a first metal powder having a first average grain diameter;

a second metal powder having a second average grain diameter that is smaller than the first average grain diameter; and a third metal powder having a third average grain diameter that is smaller than the second average grain diameter, wherein the first average grain diameter is 15 μm or more and 100 μm or less, wherein the second average grain diameter is 3 μm or more and less than 10 μm, and wherein the third average grain diameter is more than one-fifth of the second average grain diameter and 2 μm or less.

14. The magnetic metal powder as claimed in claim 13, wherein a magnetic permeability of the first metal powder is higher than that of the second and third metal powders.

15. The magnetic metal powder as claimed in claim 14, wherein the first metal powder mainly contains Permalloy, and the second and third metal powders mainly contain iron.

16. The magnetic metal powder as claimed in claim 13, wherein the first metal powder mainly contains Permalloy, and the second and third metal powders mainly contain iron.

17. The magnetic metal powder as claimed in claim 16, wherein an average grain diameter of the iron in the second metal powder is 0.1 to 0.3 times of an average grain diameter of the Permalloy in the first metal powder.

18. The magnetic metal powder as claimed in claim 13, wherein a weight ratio of the first metal powder, the second metal powder, and the third metal powder, respectively, is in a range from 70:15:15 to 80:10:10.

19. The magnetic metal powder as claimed in claim 13, wherein the second average grain diameter is 8 μm or less.

20. The magnetic metal powder as claimed in claim 13, wherein the second average grain diameter is 3 μm or more and 4 μm or less, and wherein the third average grain diameter is 1 μm or less.

* * * * *